United States Patent Office 2,775,868
Patented Jan. 1, 1957

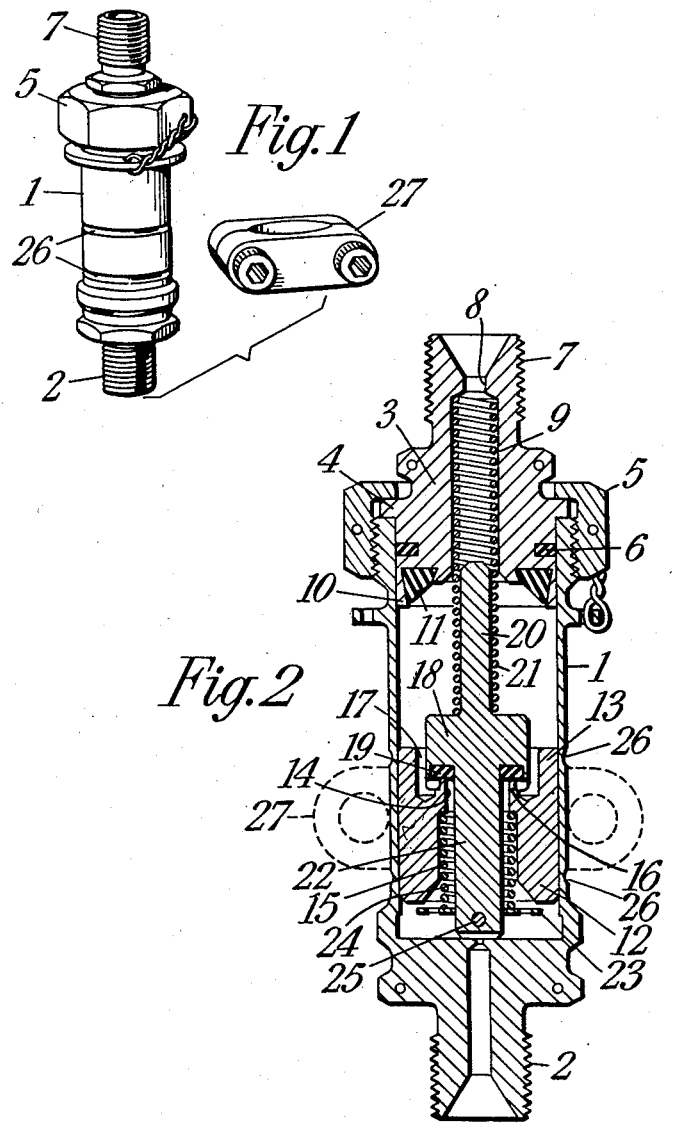

2,775,868
LIQUID PRESSURE RELAYS

Henry William Trevaskis, Solihull, England, assignor to Dunlop Rubber Company Limited, London County, England, a British company Application August 24, 1951, Serial No. 243,536

Claims priority, application Great Britain September 16, 1950

8 Claims. (Cl. 60—54.6)

This invention relates to liquid pressure relays and more particularly to liquid pressure relays used in conjunction with pressure gauges in hydraulic systems.

Should a pressure gauge or the like fail during service, due, for example, to a leak in the gauge or to a fracture in the auxiliary line leading thereto from the main system, hydraulic liquid will escape through the leak, and uncontrolled leakage of liquid will result in the inefficient working of the associated hydraulic mechanism, or even in a complete breakdown of said mechanism, through lack of pressure liquid. This is particularly serious in aircraft which relay largely on hydraulic mechanisms to operate the brakes, retractable undercarriages, rudders, flaps and the like.

Pressure relays are known which basically comprise a cylinder and a piston slidable therein. This device is interposed in the hydraulic auxiliary pressure line leading to the pressure gauge and is located adjacent the gauge, one end of the cylinder being connected to a source of liquid pressure, i. e. the main system, and the other end being connected to the gauge. When the pressure line leading to the source of liquid pressure, hereinafter termed the upstream pressure line, is pressurized, the piston is forced along the cylinder, thus pressurizing the liquid therein and also the liquid in the pressure line leading to the pressure gauge, hereinafter termed the downstream pressure line. The pressure gauge is thus actuated to indicate the increase in pressure. Should the gauge fail or the downstream pressure line fracture, and leakage occur, the piston, when the upstream pressure line is pressurized, will move to the downstream end of the cylinder and will block the pressure line leading to the gauge, thus preventing the further flow of liquid from the cylinder.

The relay is primed by inserting hydraulic liquid into the cylinder and downstream pressure line, ensuring at the same time that the piston is at the upstream end of the cylinder and that there are no air bubbles trapped in the cylinder or pressure lines. It is not an easy process to prime a relay of this type and the object of the present invention is to provide a liquid pressure relay which is efficient in operation and is simply and readily primed.

According to the invention a liquid pressure relay comprises a cylinder having an inlet end for connection to a source of liquid pressure and an outlet end for connection to a mechanism to be operated, a piston slidable in the cylinder spring-urged towards the inlet end and adapted to form a liquid-tight seal with a seating at the outlet end when subjected to liquid pressure on its inlet face, means for preventing movement of the piston when subjected to said pressure and a valve in the piston adapted to open when said movement is prevented.

Preferably the piston is annular and has a valve seat on the outlet side thereof. A valve is provided to seat on said valve seat and a spring maintains the valve and valve seat together in seating engagement. Means are provided to hold the annular piston immovable and allow the valve to open under the liquid pressure from the source. Liquid will thus flow through the valve and prime the relay.

In order that the invention may be more fully described reference is made to the accompanying drawings, of which Fig. 1 is a perspective sketch of a relay and clamp constructed in accordance with the present invention.

Fig. 2 is a longitudinal section through the relay of Fig. 1, the clamp being shown in position in dotted lines.

The relay comprises a cylinder 1 provided at one end with an integral pipe connection 2. The connection is threaded and is adapted to be connected to a source of liquid pressure i. e. the upstream pressure line. A closure member 3 is fitted to the open end of the cylinder, said closure member being provided with an outwardly-extending annular lip 4 which abuts the end of the cylinder and is held thereon by a sleeve-nut 5 threadably engaging with the end of the cylinder. A part of the closure member extends axially into the cylinder and is a sliding fit therein and a sealing ring 6 is provided to prevent leakage of hydraulic liquid along the interface. A pipe connection 7 is provided integral with the closure member on the side remote from the cylinder and a passage 8 extends axially through said connection and terminates in a hole 9 of larger diameter which extends axially through the closure member and communicates with the cylinder. The pipe connection 7 is adapted to be connected to the downstream pressure line e. g. to a pressure gauge.

A skirt 10 extends axially from the face of the closure member within the cylinder and an annular rubber fillet 11 of triangular section is fitted within said skirt and forms a seating for a valve, to be hereinafter described.

A skirted piston 12 is slidable in the cylinder, the skirt 13 thereof being on the side of the piston adjacent the closure member. From this side of the piston a hole 14 extends axially a short distance into the piston and communicates with a hole 15 which extends through to the other side thereof. The end of this hole, i. e. on the face of the piston remote from the closure member, is countersunk. An annular lip 16 extends axially from the inner periphery of the face of the piston adjacent the closure member to a location substantially midway between said face and the end of the piston skirt, and said lip constitutes a valve seat. The inner periphery of the piston skirt is provided with a plurality of equispaced rectangular ribs 17 extending radially inwardly therefrom.

A valve 18 operates within the piston skirt, having an annular rubber seating member 19 to co-operate with the valve seat, and said valve is a sliding fit between the ends of the rectangular ribs 17 extending inwardly from the piston skirt. A valve stem 20 extends centrally from the face of the valve facing the closure member to a location within the larged diameter hole 9 in said closure member, and is of smaller diameter than said hole. A helical valve return spring 21 under compression is fitted over said stem and has one end abutting the valve 18 and the other end abutting the shoulder formed at the junction of the two holes in the closure member 3. The annular edge of the valve face facing the closure member is adapted to abut the rubber fillet 11 in the skirt of the closure member and prevent the passage of pressure liquid through said closure member.

A spigot 22 extends centrally from the other face of the valve, through the co-axial passage in the piston, to a location on the other side of the piston, and said spigot is of smaller diameter than the diameter of the passage through which it passes. An annular washer 23 fits over the end of the spigot remote from the valve and a compression spring 24 has one end abutting the surface of the washer near its inner periphery and the other end abutting the shoulder formed in the passage through the piston. A pin 25 extending transversely through the spigot adjacent its end has both ends projecting, and serves to prevent the washer from quitting the end of the spigot. The surface of the washer near its outer periphery is adapted to abut the face of the piston remote from the closure member 3 and a plurality of holes are provided through the washer between said inner and outer peripheries.

The outer periphery of the cylinder is provided with two annular grooves 26, spaced a short distance apart and located adjacent the upstream end of the cylinder.

In the normal operative positions of the piston 12 and valve 18 relative to one another, the spring 24 in the piston tends to force the washer 23 away from the piston, hence closing the valve. Moreover, the valve is forced away from the closure member by the spring associated therewith, and this normally maintains both valve and piston at the end of the cylinder remote from the closure member, i. e. the upstream end.

The liquid pressure relay is installed as follows. The pipe connection 2, i. e. the upstream end of the relay, is connected to the source of fluid pressure, and the downstream connection 7 is connected to the gauge. The valve spring 21 forces the valve 18 and piston 12 down the cylinder until the end of the spigot 22 is abutting the end of the cylinder, and the piston is in such a position, relative to the spigot, that the valve is shut. The piston is retained in this position by means external of the cylinder and comprising a tightened clamp 27 (Fig. 1) passing around the cylinder between the grooves 26 and slightly deforming its sides, within the elastic limit of the material, so that movement of the piston is impossible. The clamp is shown in dotted lines in Fig. 2 fitted in position around the cylinder.

Pressure liquid is then allowed to flow to the relay through the inlet 2, and this liquid flows through the holes in the washer 23 and, striking the portion of the valve 18 between the valve seat 16 and the spigot 22, moves the valve away from the seat and against the valve spring. Pressure liquid thus flows freely into the cylinder. Having filled the cylinder the liquid flows through the downstream connection 7 and through the pressure line attached thereto to the gauge. If a bleed-cock is incorporated in the gauge said cock is left open until liquid flows freely through it, and it is then shut. If a bleed-cock is not incorporated the gauge is disconnected and separately primed and is connected to the end of the pressure line when the line is full of liquid. The relay and gauge are now primed, and hydraulic pressure relieved and the clamp is removed from the cylinder, allowing the piston to move under the action of its spring to close the valve. The pressure on both sides of the piston is now substantially equal and the relay and gauge are ready for service.

In service the relay operates as follows. As the upstream side 2 of the relay is pressurized the piston 12 is moved along the cylinder, the valve in the piston remaining closed, and continues to move until the pressure on both sides of the piston is again substantially equal. The increased pressure in the downstream side of the relay operates the gauge to indicate the increase in pressure on the gauge dial. When the pressure is relieved on the upstream side of the relay the greater pressure on the downstream side of the relay forces the piston back to its original position in the cylinder, the valve return spring 21 maintaining the valve in the closed position, and the gauge indicator returns to a "zero" position.

If the pressure on the downstream side of a relay of the old type should exceed that on the upstream side when said upstream side is unpressurized and the end of the piston is abutting the upstream end of the cylinder, then the gauge will not return to "zero." This may be due, for example, to the liquid in the downstream side becoming heated, or to liquid leaking past the piston from its upstream side to its downstream side. In the relay of the present invention, if any unbalanced pressure of this nature tends to build-up, the pressure acting on the skirted face of the piston 12 will compress the piston spring and move the piston, the valve remaining immovable. This will open the valve and allow the pressure on both sides of the piston to equalize.

If the gauge or associated pipe line should develop a leak, the piston and valve will move up the cylinder under the action of the greater pressure from the upstream side of the relay and the piston will force the edge of the valve remote from the piston into sealing engagement with the rubber fillet 11 in the skirting of the closure member. The amount of liquid lost by the leak will therefore be restricted to only a proportion of that contained in the gauge and in the pipe on the downstream side of the relay.

Having described my invention, what I claim is:

1. A pressure liquid relay comprising a cylinder having an inlet at one end and an outlet at the opposite end, an outlet valve seat encircling said outlet at the opposite end of said cylinder, an annular piston slidable fluid-tightly in said cylinder between said inlet end and said outlet end, said piston having an annular valve seat about its inner periphery and facing said outlet end of the cylinder and having a passage from the inlet end to the outlet end of the cylinder through said annular valve seat, a valve element between said outlet valve seat and said annular valve seat and movable to seat on said outlet valve seat and on said annular valve seat and having a pin stop extending through said piston to limit the movement of said valve element toward said inlet end and having a spring retaining means spaced from the inlet side of said valve element, a spring to press said valve element to seat on said annular valve seat, a compression spring about said pin stop and confined between said spring retaining means and said piston to bias said piston to yieldingly seat said valve element on said annular valve seat and to permit said valve element to move from said anular valve seat when the end of said pin stop abuts the inlet end of the cylinder, and manually operable means to hold said piston at a distance from the outlet end of said outlet valve seat.

2. The pressure liquid relay of claim 1 in which said manually operable means comprises a clamp about said cylinder to compress the cylinder walls into a gripping engagement with said piston.

3. A pressure liquid relay comprising a cylinder having an inlet at one end and an outlet valve seat and an outlet therefrom at the opposite end, a piston slidable fluid-tightly in said cylinder between said inlet and said outlet valve seat, said piston having a passage therethrough to permit passage of fluid from said inlet to said outlet and having an annular valve seat facing toward said outlet valve seat, a valve element between said annular valve seat and said outlet valve seat movable in one direction to seat on said annular valve seat and in the opposite direction to seat on said outlet valve seat, said valve element having a stop pin extending through said piston toward the inlet end of said cylinder, a compression spring encircling and supported on said pin stop between said pin stop and said piston to bias said pin stop and valve element to seat said valve element on said annular valve seat and to permit said valve element to move from said annular valve seat when said pin stop comes into abutment with the inlet end of the cylinder and to open toward said outlet under fluid pressure from said inlet, a second compression spring between said valve element and the outlet end of said cylinder to bias said valve element toward the inlet end of said cylinder and manually operable means to hold said piston at a fixed distance from said outlet valve seat while permitting said valve element to move.

4. The pressure liquid relay of claim 3 in which said means to hold said piston at said fixed distance from said outlet valve seat comprises a clamp positioned to compress the wall of said cylinder to grip said piston.

5. A pressure liquid relay comprising a cylinder having an inlet at one end and an outlet valve seat and an outlet therefrom at the opposite end, an annular piston slidably fluid-tightly in said cylinder between said inlet end and said outlet valve seat and having an annular valve seat facing said outlet valve seat and having a passage from said annular valve set through said piston, a valve element movable between said annular valve seat and said outlet valve seat and having a stem projecting axially through said piston to stop at the inlet end of said cylinder, a compression spring extending between the outlet side of said valve element and the outlet end of said cylinder to bias said valve to seat on said annular valve seat, a second compression spring supported by said stem to bear on the inlet side of said piston and biasing said piston to bring said annular valve seat into engagement with said valve element, and manually operable means to hold said piston at a distance from said outlet valve seat.

6. The pressure liquid relay of claim 5 in which said manually operable means comprises a clamp about said cylinder to compress the wall of said cylinder into gripping engagement with said piston.

7. The pressure liquid relay of claim 5 in which said stem has a washer carried thereby and in which said second spring is confined between said washer and said piston.

8. A pressure liquid relay comprising a cylinder having a pressure liquid inlet at one end and a pressure liquid outlet valve seat and pressure liquid outlet at the opposite end, an annular piston having a pressure liquid passage axially therethrough and being slidable between said inlet end and said outlet end, an annular inlet valve seat on the outlet side of said piston surrounding the liquid passage through said piston, a valve element on the outlet side of said piston movable to seat one side of said element on said annular inlet valve seat and movable in the opposite direction to seat the opposite side of said element on the outlet valve seat and having an axial spigot extending from each said side, one said spigot extending axially through said liquid passage in said piston and comprising a stop to co-operate with said inlet end of the cylinder to lift said valve element from said annular valve seat, the other spigot extending axially of said cylinder toward said outlet end, a spring surrounding said first named spigot and confined between said piston and a retaining member on said spigot normally urging said valve element to seat on said annular inlet valve seat, a second spring surrounding said second named spigot and extending between said valve element and said outlet end of the cylinder and normally urging said valve element to seat on said annular valve seat and said stop and piston towards the inlet end of the cylinder, said piston and said valve member being operable by liquid pressure in the inlet end of the cylinder to move said valve element to the outlet valve seat on reduction of the liquid pressure in said liquid outlet, and manually operable means to hold said piston and valve member at a predetermined distance from said liquid inlet end of the cylinder.

References Cited in the file of this patent

UNITED STATES PATENTS

| | | |
|---|---|---|
| 1,724,881 | Lund | Aug. 13, 1929 |
| 2,241,137 | Jones | May 6, 1941 |
| 2,385,625 | Hopmans | Sept. 25, 1945 |
| 2,593,192 | Rockwell | Apr. 15, 1952 |